DESIGN.
J. SHARKEY.
Monuments.
6,507. Reissued June 22, 1875.
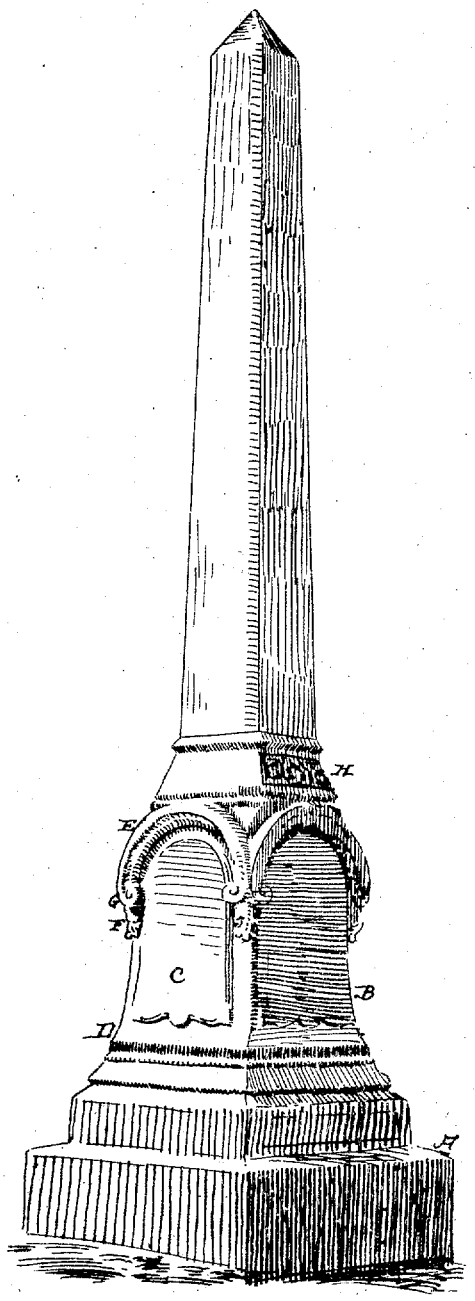
WITNESSES:
Gulquick
Alex F. Roberts
INVENTOR:
J. Sharkey
BY
Munn & Co
ATTORNEYS.

UNITED STATES PATENT OFFICE.

JAMES SHARKEY, OF BROOKLYN, NEW YORK.

DESIGN FOR MONUMENTS.

Specification forming part of Design No. 7,416, dated May 5, 1874; reissue No. 6,507, dated June 22, 1875; application filed June 5, 1875.

[Term of Patent 7 years.]

*To all whom it may concern:*

Be it known that I, JAMES SHARKEY, of Brooklyn, in the county of Kings and State of New York, have invented a new and original Design for Monuments, of which the following is a specification:

The nature of my design is fully represented in the accompanying photographic illustration, to which reference is made.

A is the base; B the pedestal, which has four curved tablets, C, raised or incised on the four curved sides D. E is an arch above each of the tablets, the base ends of which rest on ornamental trusses F. The base ends of the arches are coiled up in shape of scrolls G. H is an ornamental extension of the pedestal. I is the shaft, which is square (or circular) in cross-section to connect with the pedestal and base. The arches E, in connection with the curved sides D of pedestal B, form the novel and essential feature of the design.

I claim as my invention—

The design for a monument, in which the tablets and pedestal are curved, in connection with and surmounted by arches E resting on ornamental trusses F, substantially as shown and described.

JAMES SHARKEY.

Witnesses:
T. B. MOSHER,
ALEX. F. ROBERTS.